United States Patent
Yamazaki et al.

(10) Patent No.: US 10,118,239 B2
(45) Date of Patent: Nov. 6, 2018

(54) WIRE ELECTRIC DISCHARGE MACHINING DEVICE AND METHOD

(71) Applicant: SODICK CO., LTD., Kanagawa (JP)

(72) Inventors: Kiyoyuki Yamazaki, Kanagawa (JP); Tatsuo Matsui, Kanagawa (JP)

(73) Assignee: SODICK CO., LTD., Kanagawa (JP)

(*) Notice: Subject to any disclaimer, the term of this patent is extended or adjusted under 35 U.S.C. 154(b) by 579 days.

(21) Appl. No.: 14/361,706

(22) PCT Filed: Dec. 10, 2012

(86) PCT No.: PCT/JP2012/081993
§ 371 (c)(1),
(2) Date: May 30, 2014

(87) PCT Pub. No.: WO2013/085063
PCT Pub. Date: Jun. 13, 2013

(65) Prior Publication Data
US 2015/0231716 A1 Aug. 20, 2015

(30) Foreign Application Priority Data
Dec. 9, 2011 (JP) .................. 2011-269607

(51) Int. Cl.
*B23H 7/10* (2006.01)
*B23H 7/26* (2006.01)
*B23H 1/02* (2006.01)

(52) U.S. Cl.
CPC ............. *B23H 1/024* (2013.01); *B23H 7/104* (2013.01); *B23H 7/26* (2013.01)

(58) Field of Classification Search
CPC .......... B23H 7/10; B23H 7/104; B23H 1/024; B23H 7/04; B23H 7/20
See application file for complete search history.

(56) References Cited

U.S. PATENT DOCUMENTS 3,781,507 A * 12/1973 Inoue ................. B23H 1/022
219/69.16
4,223,198 A * 9/1980 Inoue .................. B23H 7/04
219/69.12

(Continued)

FOREIGN PATENT DOCUMENTS

JP 61-111823 5/1986
JP 61-111834 5/1986

(Continued)

OTHER PUBLICATIONS

"International Search Report (Form PCT/ISA/210)", dated Mar. 12, 2013, pp. 1-6.

*Primary Examiner* — Ibrahime A Abraham
*Assistant Examiner* — Gyounghyun Bae
(74) *Attorney, Agent, or Firm* — JCIPRNET (57) ABSTRACT

Provided is a wire electric discharge machining device and method capable of reliably terminating a short circuit between a wire electrode and a workpiece. The invention relates to a wire electric discharge machining device that starts machining of a workpiece (3) by generating an electric discharge in a machining gap formed between the workpiece and a wire electrode (2) threaded through a start hole (4) in the workpiece. The wire electric discharge machining device includes: a tension control device (56) that controls tension of the wire electrode so as to maintain the tension at a set value; a short circuit detector (57) that detects a short circuit between the wire electrode and the workpiece; and a short circuit termination system that reduces the tension of the wire electrode and vibrates the wire electrode in order to terminate a short circuit when the short circuit detector has detected the short circuit.

8 Claims, 7 Drawing Sheets

(56) References Cited

U.S. PATENT DOCUMENTS

| | | | | |
|---|---|---|---|---|
| 4,518,842 A * | 5/1985 | Obara | ............... | B23H 7/04 |
| | | | | 219/69.12 |
| 4,530,471 A * | 7/1985 | Inoue | ............... | B23H 7/10 |
| | | | | 219/69.12 |
| 4,535,217 A * | 8/1985 | de Bruyn | ............... | B23H 1/024 |
| | | | | 219/69.17 |
| 4,575,603 A * | 3/1986 | Inoue | ............... | B23H 7/101 |
| | | | | 204/206 |
| 4,614,854 A * | 9/1986 | Obara | ............... | B23H 1/024 |
| | | | | 219/69.13 |
| 4,798,929 A * | 1/1989 | Itoh | ............... | B23H 1/024 |
| | | | | 219/69.12 |
| 4,885,449 A * | 12/1989 | Suzuki | ............... | B23H 7/20 |
| | | | | 219/69.11 |
| 5,039,834 A * | 8/1991 | Obara | ............... | B23H 7/04 |
| | | | | 219/69.12 |
| 5,216,217 A * | 6/1993 | Morishita | ............... | B23H 7/104 |
| | | | | 219/69.12 |
| 5,302,796 A * | 4/1994 | Kuriki | ............... | B23H 7/10 |
| | | | | 219/69.12 |
| 5,523,538 A * | 6/1996 | Matsuda | ............... | B23H 7/108 |
| | | | | 219/69.12 |
| 5,676,860 A * | 10/1997 | Muro | ............... | B23H 7/38 |
| | | | | 219/69.16 |
| 5,852,268 A * | 12/1998 | Buhler | ............... | B23H 7/04 |
| | | | | 219/69.12 |
| 6,028,282 A * | 2/2000 | Toyonaga | ............... | B23H 7/104 |
| | | | | 219/69.12 |
| 6,326,578 B1 * | 12/2001 | Hosaka | ............... | B23H 7/104 |
| | | | | 219/69.12 |
| 8,093,527 B2 * | 1/2012 | Giandomenico | ............... | B23H 7/04 |
| | | | | 219/69.12 |
| 8,735,762 B2 * | 5/2014 | Murai | ............... | B23H 1/024 |
| | | | | 219/69.12 |
| 8,829,383 B2 * | 9/2014 | Onodera | ............... | B23H 7/065 |
| | | | | 219/69.12 |
| 2003/0010753 A1* | 1/2003 | Yamada | ............... | B23H 7/102 |
| | | | | 219/69.12 |
| 2005/0269296 A1* | 12/2005 | Arakawa | ............... | B23H 7/04 |
| | | | | 219/69.12 |
| 2008/0142487 A1* | 6/2008 | Sakaguchi | ............... | B23H 7/102 |
| | | | | 219/69.12 |
| 2008/0217300 A1* | 9/2008 | Kita | ............... | B23H 7/104 |
| | | | | 219/69.12 |
| 2013/0240487 A1* | 9/2013 | Miyake | ............... | B23H 1/028 |
| | | | | 219/69.12 |

FOREIGN PATENT DOCUMENTS

| | | | |
|---|---|---|---|
| JP | 61-111841 | | 5/1986 |
| JP | 62-124827 | | 6/1987 |
| JP | 62-287919 | | 12/1987 |
| JP | 63-318211 | | 12/1988 |
| JP | H0622763 | | 3/1994 |
| JP | 07-090424 | | 4/1995 |
| JP | 09-108950 | | 4/1997 |
| JP | 2004345066 A | * | 12/2004 |
| JP | 2005-001054 | | 1/2005 |
| JP | 2008-012644 | | 1/2008 |

* cited by examiner

WIRE ELECTRIC DISCHARGE MACHINING DEVICE AND METHOD

CROSS-REFERENCE TO RELATED APPLICATION

This application is a 371 application of an international PCT application serial no. PCT/JP2012/081993, filed on Dec. 10, 2012, which claims the priority benefit of Japan application no. 2011-269607, filed on Dec. 9, 2011. The entirety of each of the above-mentioned patent applications is hereby incorporated by reference herein and made a part of this specification.

BACKGROUND

Technical Field

The invention relates to a wire electric discharge machining device and method that machine a workpiece by generating an electric discharge in a machining gap formed between a wire electrode and the workpiece. Particularly, the invention relates to a wire electric discharge machining device and method that terminate an unintentional short circuit when the unintentional short circuit is detected between a wire electrode and a workpiece.

Description of Related Art

Generally, in a wire electric discharge machining device, a wire electrode is moved relative to a workpiece within a horizontal plane ("xy plane"). Before machining, the wire electrode has to be supported vertically to the xy plane between a pair of wire guides. If necessary, a start hole for passing the wire electrode therethrough is formed in the workpiece. The start hole may be limited to a small size, and a gap (hereinafter referred to as clearance) between the wire electrode and the start hole may be small.

Figure 8:
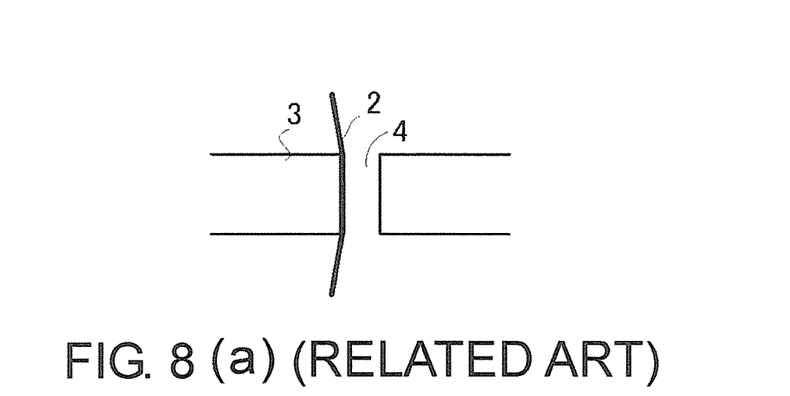
FIGS. 8(a) and 8(b) show a conventional method of terminating a short circuit.

The wire electrode has to be delivered from an upper wire guide to a lower wire guide through the start hole. After the wire electrode is extended between the upper and lower wire guides while the wire electrode has been given a predetermined tension, an unintentional contact between the wire electrode in the start hole and the workpiece may be electrically detected. FIG. 8(a) shows a state where due to such unintentional contact, a machining gap cannot be formed and electric discharge machining cannot be performed. Patent Literature 1 discloses a method of terminating a short circuit by moving a wire electrode 2 within the xy plane relatively to a workpiece 3, as shown in FIG. 8(b).

PRIOR-ART LITERATURE

Patent Literature

Patent Literature 1: Japanese Published Examined Application No. Hei 7-090424

SUMMARY OF THE INVENTION

Problems to be Solved by the Invention

Nonetheless, as shown in FIG. 9(a), a small start hole 4 may not be formed vertical, depending on machining accuracy. In that case, the wire electrode 2 may unintentionally contact one of the top or bottom face of the workpiece 3. Even if the wire electrode 2 is moved within the xy plane relatively to the workpiece 3 in order to terminate this short circuit, as shown in FIG. 9(b), the wire electrode 2 may unintentionally contact the other one of the top or bottom face of the workpiece 3. An objective of the invention is to provide a wire electric discharge machining device and method capable of reliably terminating the short circuit between the wire electrode and the workpiece.

Means for Solving the Problems

The invention relates to a wire electric discharge machining device that starts machining of a workpiece (3) by generating an electric discharge in a machining gap formed between the workpiece and a wire electrode (2) threaded through a start hole (4) in the workpiece.

The wire electric discharge machining device of the invention includes: a tension control device (56) that controls tension of the wire electrode so as to maintain the tension at a set value; a short circuit detector (57) that detects a short circuit between the wire electrode and the workpiece; and a short circuit termination system that reduces the tension of the wire electrode and vibrates the wire electrode in order to terminate a short circuit when the short circuit detector has detected the short circuit.

According to the invention, the short circuit termination system is capable of reliably terminating the short circuit by bending the wire electrode in the start hole.

The short circuit termination system may reduce a set value of tension when the short circuit detector has detected the short circuit. The set value of tension may be reduced to 10 to 50%.

The short circuit termination system may include a vibration device that vibrates the wire electrode by jetting a high pressure dielectric liquid to the wire electrode. Or, the short circuit termination system may include a vertical motion device (30) that slightly vertically moves the wire electrode by compressed air. The vertical motion device may supply the compressed air in a manner to cross the wire electrode to vibrate the wire electrode transversely. The vertical motion device may include a wire guide (32) having a guide hole through which the wire electrode passes, and the wire guide may be moved upward by the compressed air.

The tension control device may output a command based on a detected value of tension of the wire electrode and a gain, and the short circuit termination system may reduce the gain when the short circuit detector has detected the short circuit. The short circuit termination system may reduce a running speed of the wire electrode when the short circuit detector has detected the short circuit.

In addition, the invention relates to a wire electric discharge machining method that starts machining of a workpiece by generating an electric discharge in a machining gap formed between a wire electrode and the workpiece.

The wire electric discharge machining method of the invention includes the following steps: threading the wire electrode (2) through a start hole (4) in the workpiece (3); running the wire electrode by giving a predetermined tension thereto; applying a voltage between the wire electrode and the workpiece in order to generate the electric discharge in the machining gap; detecting a short circuit between the wire electrode and the workpiece; and reducing the tension of the wire electrode and vibrating the wire electrode in order to terminate the short circuit.

Effects of the Invention

According to the invention, even if the start hole is not formed vertical, the short circuit between the wire electrode and the workpiece is reliably terminated. Even if a burr is formed at an opening of the start hole on the top or bottom face of the workpiece, the short circuit between the wire electrode and the workpiece is reliably terminated.

DESCRIPTION OF THE EMBODIMENTS

Figure 1:
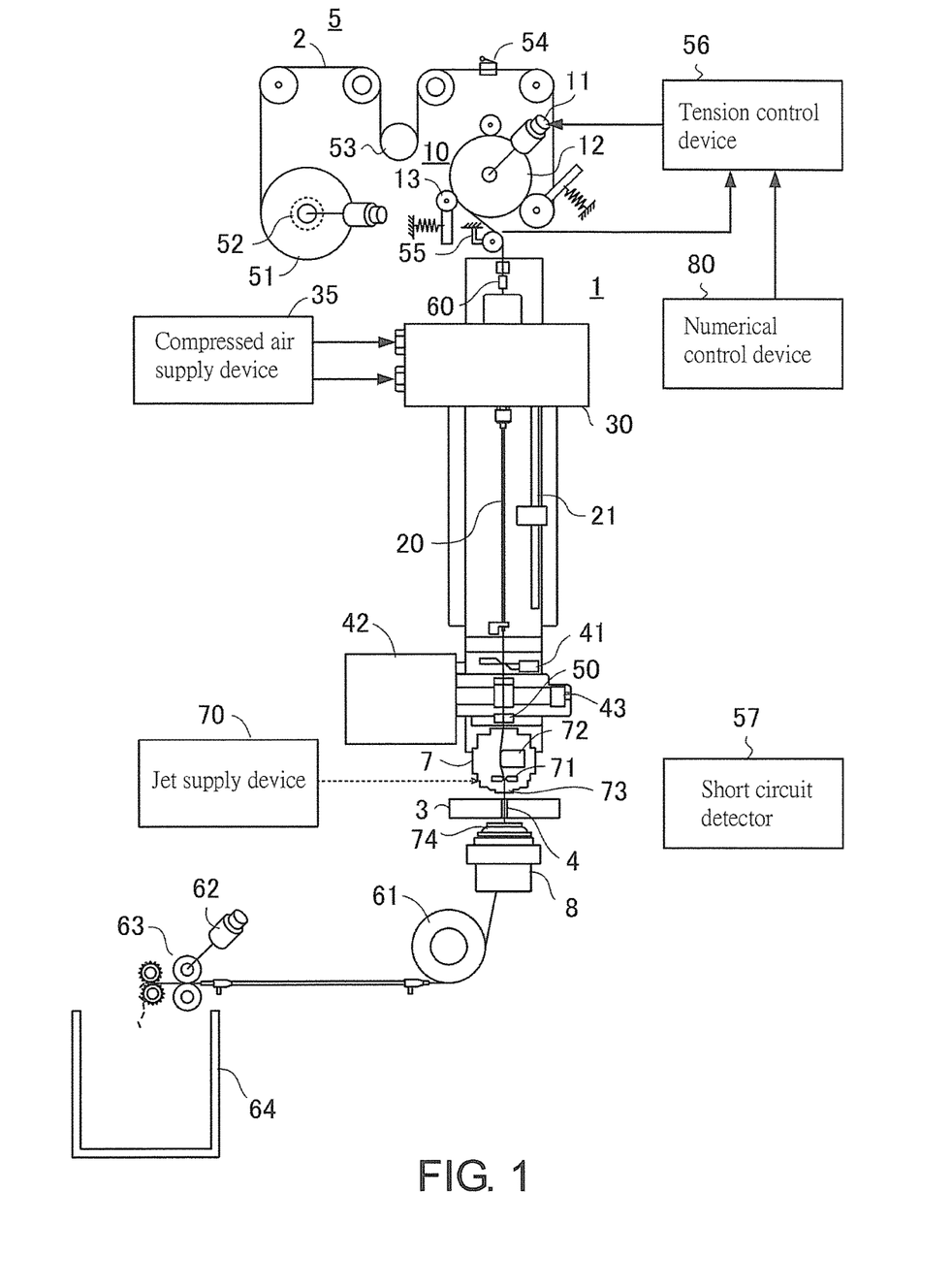
FIG. 1 shows a wire electric discharge machining device of the invention.

In order to terminate a short circuit, the wire electric discharge machining device of the invention includes a short circuit termination system that reduces tension of the wire electrode 2 and vibrates the wire electrode 2. The wire electric discharge machining device of the invention is shown in FIG. 1. A supply mechanism 5 continuously supplies a new wire electrode 2 to the workpiece 3. The supply mechanism 5 includes a reel 52, a servo pulley 53, a disconnection detector 54, a feeding roller 10, and a tension detector 55. A wire bobbin 51 is mounted to the reel 52. The reel 52 has a brake motor giving a back tension to the wire electrode 2. The servo pulley 53 prevents variation in tension. The disconnection detector 54 is disposed for detecting breakage of the wire electrode 2, and is, for example, a limit switch.

The feeding roller 10 consists of a driving roller 12 and a pinch roller 13. The driving roller 12 is rotated by a servomotor 11. The pinch roller 13 is driven by the driving roller 12 to press the wire electrode 2. The feeding roller 10 sends the wire electrode 2 toward a collecting roller 63. In addition, the feeding roller 10 cooperates with the collecting roller 63 to give a predetermined tension to the running wire electrode 2. The tension for maintaining the straightness of the wire electrode 2 is set in accordance with the diameter and material of the wire electrode 2 and the machining type. A set value of wire tension is stored in a numerical control device 80.

The tension detector 55 is disposed for detecting the tension of the wire electrode 2, and is, for example, a strain gauge. An output of the tension detector 55 is supplied to a tension control device 56. The numerical control device 80 supplies a set value indicating the wire tension and a set value indicating the wire speed to the tension control device 56. The tension control device 56 determines a rotational speed of the servomotor 11 so as to maintain a detected value of the wire tension at a set value. A command value of the rotational speed of the servomotor 11 is determined based on a tension command obtained by multiplying a deviation between the detected value and the set value of the wire tension by a gain. A short circuit detector 57 is disposed for detecting a short circuit between the wire electrode 2 and the workpiece 3. The tension control device 56 generates a tension command based on a detected value of the tension of the wire electrode 2 and a gain, and the short circuit termination system reduces the gain when the short circuit detector 57 has detected the short circuit.

Guide assemblies 7 and 8 are disposed respectively above and below the workpiece 3. The upper guide assembly 7 accommodates an upper wire guide 71, an upper conducting body 72, and an AWT nozzle (not illustrated). The upper guide assembly 7 has a jet nozzle 73 at its lower end. The lower guide assembly 8 also has a wire guide, a conducting body and a jet nozzle 74.

The guide assemblies 7 and 8 constitute a portion of a dielectric liquid supply device that supplies a high pressure dielectric liquid. The dielectric liquid supply device includes a liquid reservoir, a pump, and suitable piping. The jet nozzles 73 and 74 are disposed for jetting the dielectric liquid to a machining gap during machining. Openings of the jet nozzles 73 and 74 face the machining gap. The dielectric liquid supply device constitutes a vibration device that vibrates the wire electrode 2 by jetting of high pressure liquid.

A vertical motion device 30 is disposed between the feeding roller 10 and the start hole 4. The vertical motion device 30 slightly vertically moves the wire electrode 2 and vibrates it transversely by means of compressed air. The slight vertical motion means that the wire electrode 2 is moved vertically repeatedly along a wire running path during several hundred milliseconds to several seconds. The distance of the vertical motion is several millimeters to more than 20 millimeters in each of upward and downward directions.

An automatic wire threader 1 is disposed for automatically threading the wire electrode 2 through the start hole 4 formed in the workpiece 3. The automatic wire threader 1 has the feeding roller 10 that sends the wire electrode 2 to the start hole 4, and a guide pipe 20 that guides the wire electrode 2. The automatic wire threader 1 further has a cutter 41 that removes a rough tip of the wire electrode 2. A clamp 43 is disposed to convey the removed wire piece to a waste box 42. The automatic wire threader 1 is provided with a tip detector 50 that detects the tip of the wire electrode 2, and a buckling detector 60 that detects bending of the wire electrode 2.

The automatic wire threader 1 is provided with a jet supply device 70 capable of supplying a high pressure dielectric liquid to the AWT nozzle. The AWT nozzle forms a fluid jet that constrains the wire electrode 2. The fluid jet increases the success rate of automatic wire threading. The jet supply device 70 is selectively used where the success rate of automatic wire threading seems low. The jet supply device 70 is required when a brass wire electrode 2 of 0.05 to 0.08 mm in diameter is used, or when the clearance of the start hole 4 is small.

The feeding roller 10 slowly sends out the wire electrode 2 by normal rotation. The feeding roller 10 winds up the wire electrode 2 by reverse rotation. When the tip detector 50 detects the tip of the wire electrode 2, the reverse rotation of the feeding roller 10 is stopped. The guide pipe 20 is disposed between the feeding roller 10 and the upper wire guide 71. A lifting device 21 operated by an actuator lifts the guide pipe 20 up and down. FIG. 1 shows the guide pipe 20 standing by at an upper limit position. During the automatic wire threading operation, a lower end of the guide pipe 20 is lowered down to a position immediately above the upper wire guide 71 in order to guide the wire electrode 2 to the upper wire guide 71.

The wire electrode 2 that has been used is sent to a bucket 64 via an idling roller 61 and the collecting roller 63. The collecting roller 63 is disposed for collecting the wire electrode 2. A motor 62 is connected to a driving pulley of the collecting roller 63. A device that controls the running speed of the wire electrode 2 determines a rotational speed of the motor 62 based on the set value of the wire speed. The set value of the wire speed is stored in the numerical control device 80.

Figure 2:
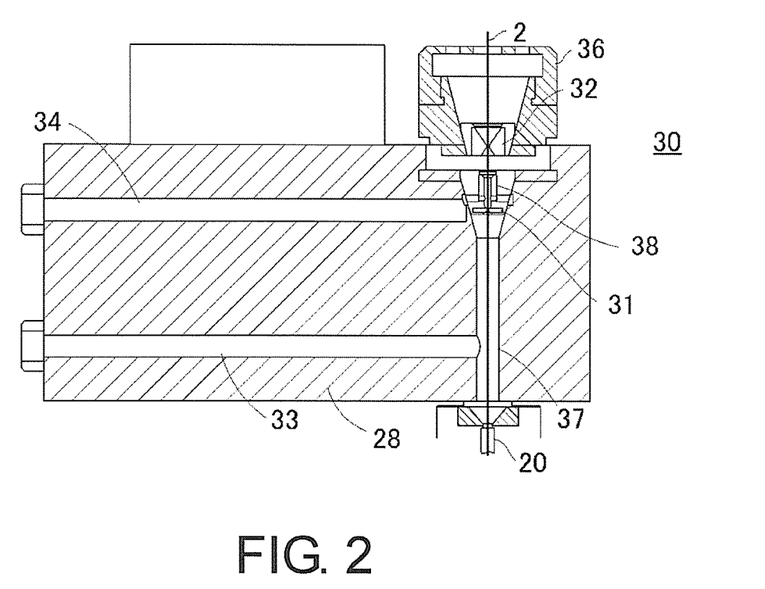
FIG. 2 is a cross-sectional diagram showing the vertical motion device in FIG. 1.
Figure 3:
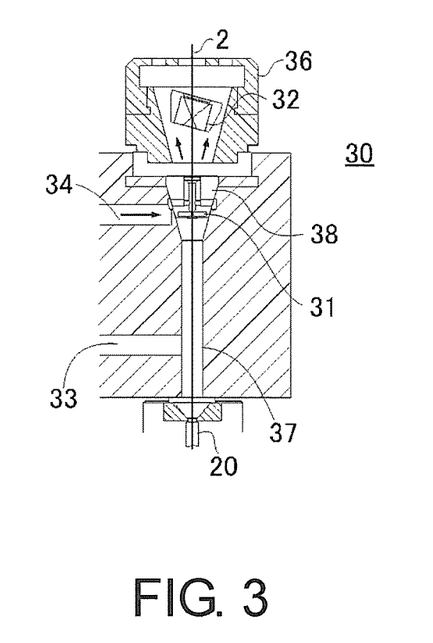
FIG. 3 is a cross-sectional diagram showing a flow of compressed air in the vertical motion device in FIG. 2.
Figure 4:
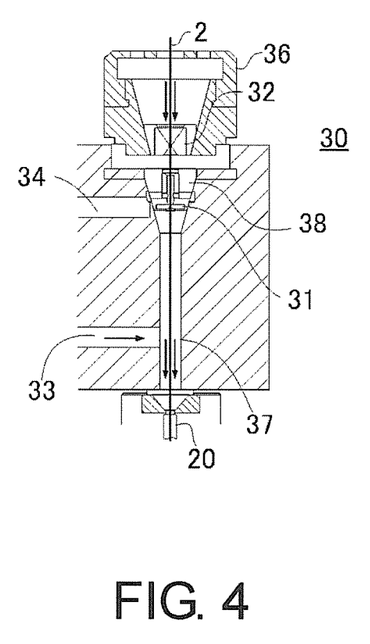
FIG. 4 is a cross-sectional diagram showing a flow of compressed air in the vertical motion device in FIG. 2.

Referring to FIGS. 2, 3 and 4, the vertical motion device 30 is illustrated in detail. Arrows in FIGS. 3 and 4 indicate the flow of the air. The wire electrode 2 vibrates only transversely if the compressed air is merely blown to the wire electrode 2. It is necessary to move the wire electrode 2 back and forth in upward and downward directions little by little in a short time. By means of the structure shown in FIG. 2, the vertical motion device 30 moves the wire electrode 2 by a force of the air for several millimeters to more than 20 millimeters in the upward and downward directions respectively during several hundred milliseconds to several seconds.

The vertical motion device 30 includes a rectangular block 28, a first wire guide 31, a second wire guide 32, and a compressed air supply device 35. The vertical motion device 30 has a vertical path through which the wire electrode 2 passes. A vertically extending cylindrical closed space 37 is formed in the block 28. The wire electrode 2 passes through the closed space 37, and the closed space 37 forms the vertical path. Two horizontally extending air supply paths 33 and 34 are formed in the block 28. The first wire guide 31 and the second wire guide 32 guide the wire electrode 2.

The first wire guide 31 is disposed between the feeding roller 10 and the start hole 4. Specifically, the first wire guide 31 is disposed between the feeding roller 10 and the guide pipe 20. The first wire guide 31 cannot move in the downward direction. The first wire guide 31 has a die shape and has a guide hole through which the wire electrode 2 passes. A gap between the guide hole of the wire guide and the wire electrode 2 is referred to as a guide clearance. The first wire guide 31 has a guide clearance of 3 to 20 μm, and the compressed air is mostly unable to pass through this small guide clearance.

The closed space 37 is defined by the first wire guide 31 and the guide pipe 20. The term "closed" in the closed space 37 means that the closed space 37 is not open except to the guide clearance of the first wire guide 31 and an inlet of the guide pipe 20. The second wire guide 32 is disposed between the feeding roller 10 and the first wire guide 31. The second wire guide 32 has a die shape and has a guide hole through which the wire electrode 2 passes. The guide holes of the first wire guide 31 and the second wire guide 32 form a vertical path. The second wire guide 32 has a guide clearance of the same size as that of the first wire guide. A cap 36 is fixed on top of the block 28. A funnel-shaped chamber is formed in the cap 36. The second wire guide 32 has an appearance similar to the funnel-shaped chamber, and is positioned at the bottom of the chamber by its own weight. The second wire guide 32 is freely fitted inside the funnel-shaped chamber.

The second wire guide 32 is disposed immediately above the first wire guide 31, and a closed space 38 is formed between the guide holes of the two wire guides 31 and 32. The closed space 38 forms a vertical path. The term "closed" in the closed space 38 means that the closed space 38 is not open except to the two guide clearances. The closed space 38 includes mainly a cylindrical chamber extending vertically in the first wire guide 31. The first wire guide 31 and the second wire guide 32 are replaceably attached to the block 28. Accordingly, the first wire guide 31 and the second wire guide 32 may be replaced depending on the diameter of the wire electrode 2.

The second air supply path 34 communicates with the closed space 38 in order to supply the compressed air. The vertical motion device 30 is capable of supplying the compressed air that has passed through the second air supply path 34 to the closed space 38 in a manner to cross the wire electrode 2 from a plurality of directions. Furthermore, the compressed air jets upward from the closed space 38. As a result, the second wire guide 32 floats and slightly tilts. Since the second wire guide 32 has a small guide clearance, an inner face of the guide hole of the second wire guide 32 contacts the wire electrode 2. A frictional force is generated between the second wire guide 32 and the wire electrode 2.

As shown in FIG. 3, the second wire guide 32 moves upward while maintaining the wire electrode 2 until the second wire guide 32 collides with the ceiling of the chamber of the cap 36. Since the second wire guide 32 helps the wire electrode 2 move straight upward for a predetermined distance, extremely high pressure or high speed compressed air is not required. The predetermined distance is defined by the height of the chamber in the cap 36.

The first air supply path 33 communicates with the closed space 37 in order to supply the compressed air. The compressed air supply device 35 is capable of supplying the compressed air to the first air supply path 33 at the same time when stopping supply of the compressed air through the second air supply path 34. The vertical motion device 30 is capable of supplying the compressed air that has passed through the first air supply path 33 to the closed space 37 in a manner to cross the wire electrode 2 from one direction. Since the first wire guide 31 has a small guide clearance to an extent that the compressed air almost cannot pass therethrough, the compressed air in the closed space 37 flows downward along the wire running path. As a result, as shown in FIG. 4, a strong downward air current is generated, and the lifted wire electrode 2 moves downward along the wire running path.

The compressed air supply device 35 supplies the compressed air to the first air supply path 33 and the second air supply path 34 alternately at a predetermined time interval. The compressed air supply device 35 includes an air compressor, an air regulator, a bidirectional solenoid valve that operates at high speed, and a flow control valve. The air regulator maintains the compressed air at a predetermined pressure. The bidirectional solenoid valve switches connections to the first air supply path 33 and to the second air supply path 34 at a predetermined time interval. The flow control valve is disposed between the air regulator and the bidirectional solenoid valve in order to control supply of the compressed air.

Figure 5:
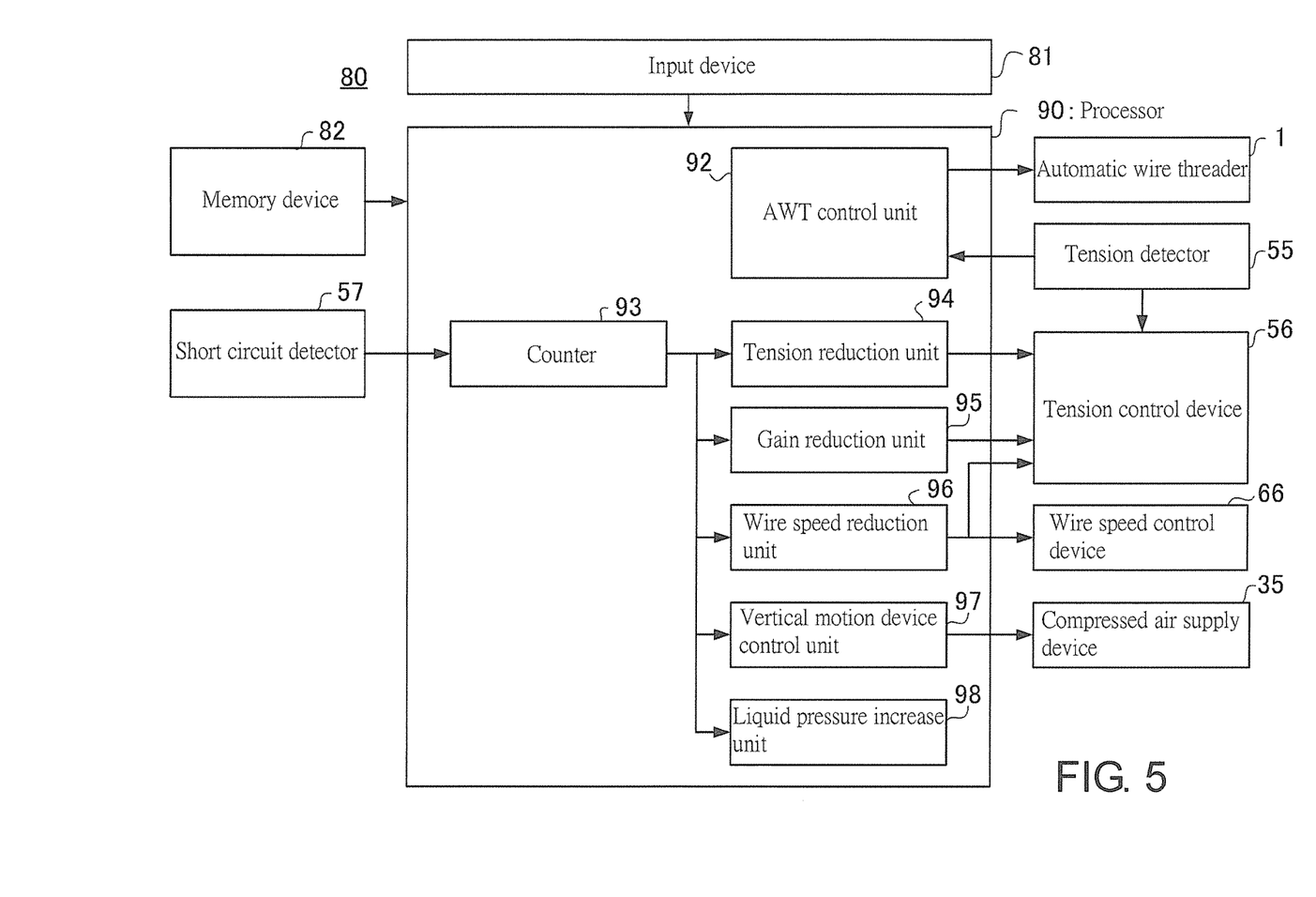
FIG. 5 is a block diagram showing the numerical control device in FIG. 1.

The numerical control device 80 is described in detail with reference to FIG. 5. The numerical control device 80 consists of an input device 81, a memory device 82, and a processor 90. The input device 81 includes a keyboard, a mouse, a touch panel and so on, sending the input information to the processor 90. An operator may set machining conditions such as wire tension set value (WT), wire speed (WS), liquid pressure (WP), etc. by using the input device 81. The liquid pressure (WP) is a pressure of the dielectric liquid jetted from the jet nozzles 73 and 74 to the machining gap during machining The memory device 82 includes a hard disk and so on. The memory device 82 stores information required for the processor 90, e.g., a wire electric discharge machining program and operations of automatic wire threading. Set values of the machining conditions inputted by the operator are also stored in the memory device 82.

A CPU cooperates with a memory to accomplish the function of the processor 90. The processor 90 includes an AWT control unit 92, a counter 93, a tension reduction unit 94, a gain reduction unit 95, a wire speed reduction unit 96, a vertical motion device control unit 97, and a liquid pressure increase unit 98. The AWT control unit 92 is configured to be capable of controlling the automatic wire threader 1 and receiving the output of the tension detector 55. The AWT control unit 92 compares the detected value of the wire tension to the wire tension set value (WT) to determine completion of the automatic wire threading.

The counter 93 is configured to be capable of receiving the output of the short circuit detector 57 and stores a short circuit termination time. When a short circuit is detected at the beginning of electric discharge machining, the short circuit termination time is commenced while the counter 93 supplies a signal that commands the tension reduction unit 94, the gain reduction unit 95, the wire speed reduction unit 96, the vertical motion device control unit 97, and the liquid pressure increase unit 98 to start operations. The tension reduction unit 94 changes the wire tension set value (WT) to a lower value. A new wire tension set value (WT) is supplied to the tension control device 56, and is stored in the tension reduction unit 94. The new wire tension set value (WT) may be 10 to 50% of the original wire tension set value (WT).

The gain reduction unit 95 changes the gain in the tension control device 56 to a lower value. As a result, responsiveness of the tension control is reduced, and the wire electrode 2 easily vibrates. The wire speed reduction unit 96 changes the wire speed set value (WS) to a lower value, and supplies the new set value (WS) to a wire speed control device 66 and the tension control device 56. The new set value (WS) is, for example, 60% or less of the original set value (WS). Generally, when the wire speed is extremely reduced, due to heavy consumption of the wire electrode, uneven electric discharge is repeated. The wire speed reduction unit 96 contributes to vibration of the wire electrode 2 by intentionally causing the uneven discharge.

In order to vibrate the wire electrode 2, the vertical motion device control unit 97 initiates the operation of the vertical motion device 30, particularly the compressed air supply device 35. In order to vibrate the wire electrode 2, the liquid pressure increase unit 98 increases the set value (WP) of pressure of the dielectric liquid jetted from the jet nozzles 73 and 74 to the wire electrode 2 in the machining gap.

Figure 6:
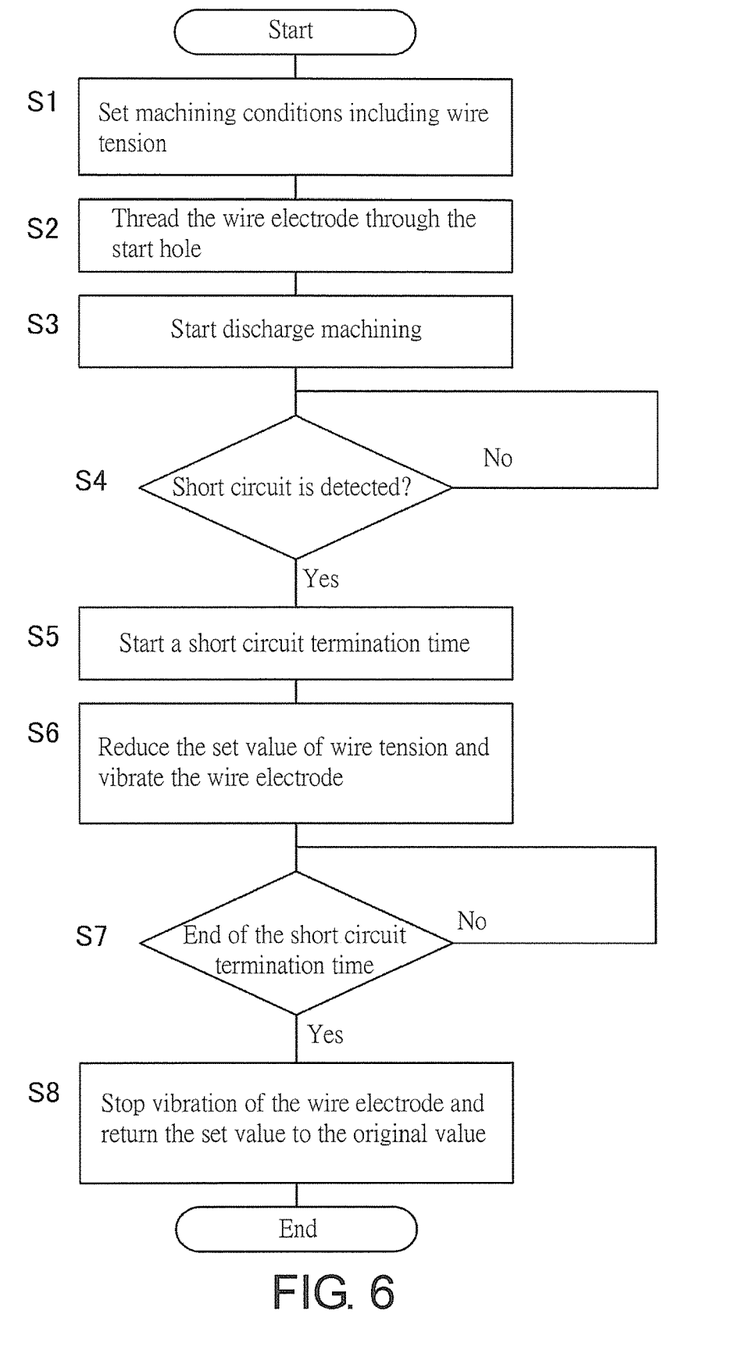
FIG. 6 is a flowchart showing actions of the numerical control device in FIG. 5.

An example of an operation process of the numerical control device 80 is described with reference to FIG. 6. In step S1, the operator sets the machining conditions such as wire tension set value (WT), wire speed (WS), liquid pressure (WP), etc. by using the input device 81. Prior to the machining, the AWT control unit 92 initiates the operation of the automatic wire threader 1. When the wire electrode 2 is threaded through the start hole 4 to reach the collecting roller 63, the automatic wire threading is completed and the process proceeds to step S3.

In step S3, the processor 90 supplies control signals to each device based on the machining conditions to start an electric discharge machining process. The dielectric liquid supply device supplies the dielectric liquid from the liquid reservoir to the guide assemblies 7 and 8. The dielectric liquid is jetted from the jet nozzles 73 and 74 to the machining gap. The wire electrode 2 is run on the wire running path according to the wire speed set value (WS). In addition, a power supply (not illustrated) applies a voltage pulse between the wire electrode 2 and the workpiece 3 in order to repeatedly generate an electric discharge.

Figure 9:
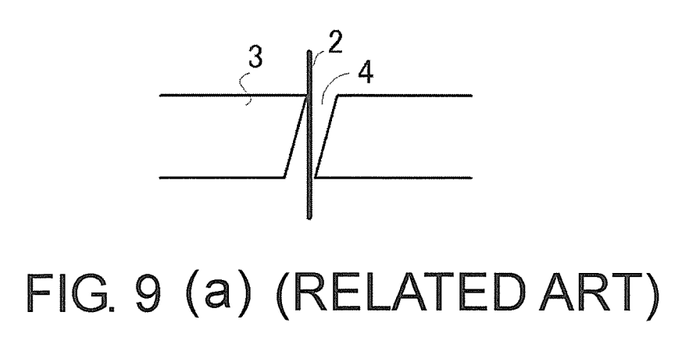
FIGS. 9(a) and 9(b) show a conventional method of terminating a short circuit.

However, as shown in FIG. 9(*a*), the wire electrode 2 and the workpiece 3 may unintentionally contact each other so that no electric discharge is generated. In that case, the counter 93 receives a signal indicating a short circuit in step S4, and in step S5, the short circuit termination time is commenced while the operations of the tension reduction unit 94, the gain reduction unit 95, the wire speed reduction unit 96, the vertical motion device control unit 97, and the liquid pressure increase unit 98 are initiated. In step S6, the tension reduction unit 94 changes the wire tension set value (WT) to a lower value. If the new wire tension set value (WT) is 10 to 50% of the original wire tension set value (WT), it is confirmed that the short circuit is effectively terminated by vibration of the wire electrode 2. In order to vibrate the wire electrode 2, the vertical motion device control unit 97 initiates the operation of the vertical motion device 30. The compressed air supply device 35 supplies the compressed air to the second air supply path 34 and the first air supply path 33 alternately. Furthermore, in order to vibrate the wire electrode 2, the liquid pressure increase unit 98 increases the liquid pressure set value (WP).

Figure 7:
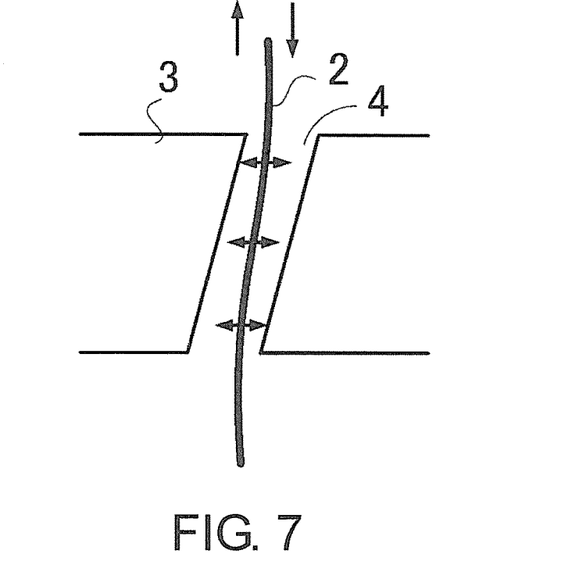
FIG. 7 shows a method of terminating a short circuit by the invention.

As shown in FIG. 7, due to large reduction in the wire tension and vibration of the wire electrode 2, the wire electrode 2 is bent. As a result, the wire electrode 2 is separated from the workpiece 3, forming the machining gap. Arrows in FIG. 7 indicate the vibrations of the wire electrode 2 in longitudinal and transverse directions. An electric discharge is generated at a place where the wire electrode 2 is closest to the workpiece 3, and the machining gap is maintained at a suitable size due to repulsive force of the electric discharge. The short circuit termination time is a time sufficient for repeatedly generating an electric discharge. In order to contribute to vibration of the wire electrode 2, the gain reduction unit 95 changes the gain in the tension control device 56 to a lower value, and the wire speed reduction unit 96 changes the wire speed set value (WS) to a lower value. When the short circuit termination time ends in step S7, the process proceeds to step S8.

In step S8, the processor 90 stops the vibration of the wire electrode 2. The operation of the vertical motion device 30 stops and the liquid pressure set value (WP) is returned to the original value. The wire speed set value (WS) is returned to the original value, and the gain in the tension control device 56 is also returned to the original value. The wire tension set value (WT) is gradually returned to the original value.

The embodiments are chosen for explaining the nature of the invention and its practical applications. Various modifications may be made with reference to the above descriptions. Although in the embodiments, the wire electrode 2 is vibrated by the vibration device using high pressure liquid jetting and the vertical motion device 30, the wire electrode 2 can be vibrated by only operating one of the two devices. Moreover, a magnetic or electrical vibration device may be used in place of the two devices. The scope of the invention is defined by the attached claims.

What is claimed is:

1. A wire electric discharge machining device that starts machining of a workpiece by generating an electric discharge in a machining gap formed between the workpiece and a wire electrode threaded through a start hole in the workpiece, the wire electric discharge machining device comprising:

a tension controller consisting of an input device, a memory device, and a processor, the tension controller outputting a command based on a detected value of tension of the wire electrode measured by a strain gauge and a gain, and controlling a rotational speed of a servomotor, which rotates a roller to give the tension of the wire electrode to be maintained at a set value;

a short circuit detection circuit detecting a short circuit between the wire electrode and the workpiece, wherein the short circuit detection circuit is connected to a counter; and a short circuit termination equipment having at least one of a vibrator or a vertical motion device having a compressed air supply device, wherein the short circuit termination equipment reduces the tension of the wire electrode and vibrates the wire electrode to terminate the short circuit when the short circuit detection circuit has detected the short circuit, wherein the short circuit termination equipment reduces the set value of the tension to 10 to 50% when the short circuit detection circuit has detected the short circuit.

2. The wire electric discharge machining device of claim 1, wherein the short circuit termination equipment reduces the set value of the tension when the short circuit detection circuit has detected the short circuit.

3. The wire electric discharge machining device of claim 1, wherein the vibrator jets a high pressure dielectric liquid to the wire electrode to vibrate the wire electrode.

4. The wire electric discharge machining device of claim 1, wherein the vertical motion device having the compressed air supply device vertically moves the wire electrode by compressed air.

5. The wire electric discharge machining device of claim 4, wherein the vertical motion device having the compressed air supply device supplies the compressed air in a manner to cross the wire electrode to vibrate the wire electrode transversely.

6. The wire electric discharge machining device of claim 4 wherein the vertical motion device having the compressed air supply device comprises a wire guide having a guide hole through which the wire electrode passes, and the wire guide is movable upwardly by the compressed air.

7. The wire electric discharge machining device of claim 1, wherein short circuit termination equipment reduces the gain when the short circuit detection circuit has detected the short circuit.

8. The wire electric discharge machining device of claim 1, wherein the short circuit termination equipment reduces a running speed of the wire electrode when the short circuit detection circuit has detected the short circuit.

* * * * *